United States Patent [19]

Daughtry

[11] 4,310,263
[45] Jan. 12, 1982

[54] PIPELINE CONNECTION SYSTEM
[75] Inventor: Arthur C. Daughtry, Houston, Tex.
[73] Assignee: Exxon Production Research Company, Houston, Tex.
[21] Appl. No.: 163,658
[22] Filed: Jun. 27, 1980
[51] Int. Cl.³ .............................................. F16L 1/04
[52] U.S. Cl. .................................. 405/169; 166/341; 166/347; 166/362
[58] Field of Search ............................... 405/168–171; 166/341–347; 285/18, 24

[56] References Cited

U.S. PATENT DOCUMENTS

| | | | |
|---|---|---|---|
| 3,431,739 | 3/1969 | Richardson et al. | 405/169 |
| 3,658,366 | 4/1972 | Welch, Jr. et al. | 285/24 |
| 3,670,513 | 6/1972 | Matthews, Jr. | 405/169 |
| 3,701,261 | 10/1972 | Nolan, Jr. | 405/169 |
| 3,775,986 | 12/1973 | Daughtry | 405/169 |
| 4,019,334 | 4/1977 | Sinclair et al. | 405/169 |
| 4,086,778 | 5/1978 | Latham et al. | 405/169 |
| 4,145,909 | 3/1979 | Daughtry | 405/168 |

OTHER PUBLICATIONS

Sinclair, Richard A., Burkhardt, J. A., and Daughtry, A. C., Exxon Production Research Co., *Deepwater Pipeline Connections-A Subsystem of the Submerged Production System*, Paper Number OTC 2526, C 1976.

*Primary Examiner*—Price C. Faw, Jr.
*Assistant Examiner*—Nancy J. Pistel
*Attorney, Agent, or Firm*—Marc L. Delflache

[57] ABSTRACT

A method and appartus are disclosed for making a subsea flowline connection between two pipelines. A connector assembly having a base plate is positioned on the sea floor to receive the ends of two intersecting pipelines. Once one of the pipelines is attached to the base plate, the base plate is displaced horizontally along the sea floor toward the other pipeline. When the second pipeline is attached to the base plate, the ends of the pipelines are a predetermined distance apart and a prefabricated spool piece is then remotely installed. In this manner, the base plate permits the connection of spatial and axial misalignments which otherwise would require the on-site fabrication and installation of a spool piece.

16 Claims, 7 Drawing Figures

PIPELINE CONNECTION SYSTEM

BACKGROUND OF THE INVENTION

1. Field of the Invention

The present invention relates to the connection of pipe. More particularly, it relates to the connection of submerged flowlines and pipelines used for the transportation of oil and gas from offshore wells and production facilities.

2. Description of the Prior Art

The development of offshore oil fields in deep water has necessitated the laying of lengthy pipelines to transport oil and gas from remotely located fields to more centrally located production facilities and storage terminals. A problem frequently encountered in laying pipeline is the making of underwater pipeline connections particularly if the connection is not diver assisted. If a pipeline is laid over great distances and in deep water, it is difficult to precisely position the end of the pipeline at the desired termination point. It is especially difficult to accurately position the ends of pipelines to be connected. In most instances, a correction in length and misalignment must first be made to make the final pipeline connections.

Over the years many attempts have been made to develop simple and reliable methods for connecting underwater pipelines. One conventional approach has been to lay the pipelines along a predetermined path so that they terminate as close as possible to the point of connection. However, because of the unpredictable sea floor contours and the difficulty in maintaining a precise path in laying the pipelines, there are invariably both spatial and axial misalignments between the ends of the pipelines.

One technique frequently used to correct for such misalignment is to insert a spool piece between the ends of the pipelines. Normally, the spool piece is a specially designed section of pipe which is accurately fabricated so as to correct for spatial or axial misalignment. After it is fabricated, the spool piece is interconnected between the ends of the pipelines. In shallow waters, joinder of the spool piece with the pipelines is typically accomplished with the assistance of divers who weld or flange-connect the spool piece to the pipelines' ends. Beyond demonstrated diver capability depths of about 500 feet, the spool piece must either be remotely inserted between the pipelines or the ends of the pipelines must be retrieved for an above-surface connection. However, remote installation techniques for inserting and connecting the spool piece using subsea, unmanned manipulator devices require an accurate alignment of the ends of the pipelines. In addition, an above-surface connection is a time-consuming and expensive operation.

An improvement over the above-surface connection is set forth in U.S. Pat. No. 3,670,513 (Matthews). In this patent, a method is disclosed for connecting an underwater pipeline to another conduit or pipeline at a fixed subsurface location. The method involves determining the subsurface distance and orientation between the free ends of a first and second pipeline which are to be connected. The free end of the first pipeline is then raised to the surface and a lateral extension which spans the subsurface distance between the free ends is attached. The first pipeline and the lateral extension are then lowered back into the water and guided into alignment with the free end of the second pipeline. A connection is then made between the lateral extension and the second pipeline's free end, thus completing the flowline connection. Since the lateral extension is connected to an end of one of the pipelines, a precise fit for the extension is not necessary. A slight misalignment can be adjusted for by moving the pipeline and attached extension along and transverse to the horizontal axis of the other pipeline until the extension is properly aligned.

The method disclosed by Matthews requires an approximate alignment between the pipelines' ends after the lateral extension is attached. Misalignments occasionally require lengthy movement of the pipelines and extension. Such a movement may be difficult to make, particularly in deep water. In addition, Matthews requires that the first pipeline be retrieved to connect the lateral extension. However, retrieving the pipeline may be difficult in deep water. Therefore, there is a need in the art for a further improved system to make subsea pipeline connections.

SUMMARY OF THE INVENTION

The present invention is directed to a method and apparatus for making a deepwater, subsea connection between two submerged flowlines or pipelines.

The method comprises the attachment of one end of a first pipeline to a moveable base plate positioned on the sea floor. The base plate is then laterally displaced along the sea floor until it is adjacent the end of the second pipeline. Preferably, the base plate is laterally displaced in a direction substantially normal to the longitudinal axis of the first pipeline. Since the first pipeline is most flexible when the base plate is move substantially normal to the first pipeline's longitudinal axis, the base plate is easily displaced. The end of a second pipeline is then attached to the base plate and a prefabricated spool piece is remotely installed between the ends of the two pipelines thereby providing fluid communication.

The apparatus is a connector assembly having a base plate capable of being submerged to the sea floor and a system for laterally displacing the base plate along the sea floor to engage the ends of the pipelines. The connector assembly also includes guide assemblies for orienting and attaching the end of each pipeline onto the base plate and an alignment structure, attached to the end of each pipeline, to engage each guide assembly and assist in the orientation and attachment of the pipelines to the base plate.

Examples of the more important features of this invention have been summarized rather broadly in order that the detailed description which follows may be better understood. There are, of course, additional features of the invention which will be described hereafter and which will also form the subject of the claims appended hereto.

BRIEF DESCRIPTION OF THE DRAWINGS

In order to more fully understand the drawings used in the detailed description of the present invention, a brief description of each drawing is provided.

DESCRIPTION OF THE PREFERRED EMBODIMENT

Figure 1:
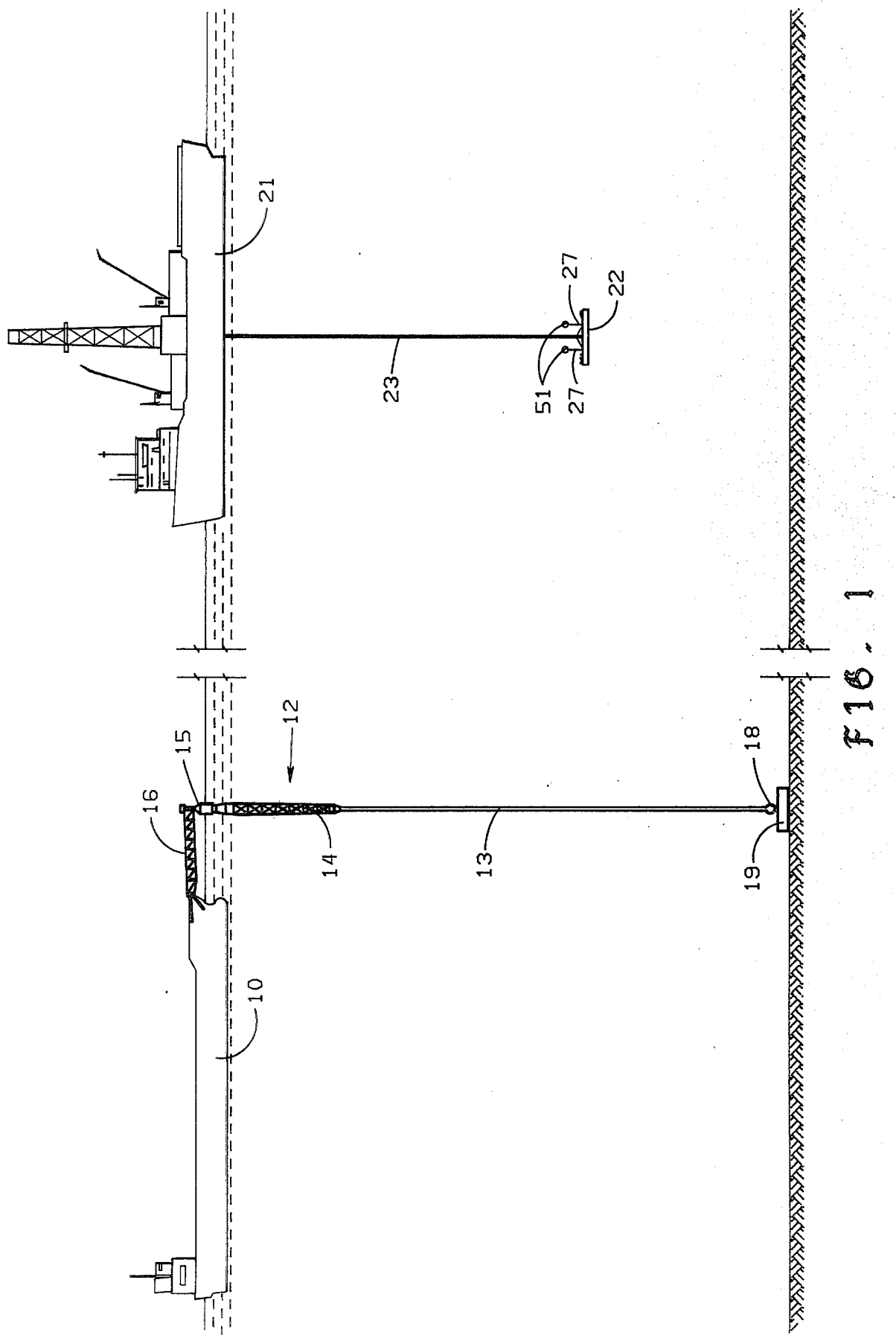
FIG. 1 is an elevation view, partly in section, of a storage tanker moored to a Single Anchor Leg Mooring system while some distance away a floating drilling vessel is lowering a base plate to the sea floor.

Referring to FIG. 1, a storage tanker 10 is shown moored to a Single Anchor Leg Mooring (SALM) system 12. The SALM 12 comprises, as its basic components a support base 19, a marine production riser 13, a spar buoy 14, a swivel 15 and a rigid mooring arm 16. The riser 13 is hinged at its lower end by a universal joint 18 to the support base 19. The universal joint 18 permits the riser 13 to move in response to wave and current action without interfering with fluid flowlines (not shown) which extend from the support base 19, up through the riser 13, spar buoy 14 and swivel 15. The flowlines exit from the swivel 15 and pass along the rigid mooring arm 16 to the tanker 10. Thus, hydrocarbons, such as crude oil, natural gas, and the like, may be pumped from various well sites and producing locations through pipelines to the SALM and stored aboard the tanker 10 until ready for loading aboard shuttle tankers. The shuttle tankers transport the hydrocarbons to onshore processing facilities such as refineries. The tanker 10 may also be used for other purposes such as a source of secondary injection fluids for the well sites. The fluids could be pumped downwardly through the riser 13 and toward various injection well sites surrounding the SALM location. Thus, the SALM 12 and tanker 10 can serve as a deepwater production and storage facility located remotely from any onshore base of operation.

Because of its storage capacity, the SALM 12 can gather hydrocarbons produced from numerous offshore wells in the vicinity. However, a pipeline is required to connect the SALM 12 with each surrounding well or a central manifold template. Each pipeline is generally made up of a series of pipeline sections which are interconnected. Since all of the wells are submerged satellite wells located in deep water, It may be necessary to remotely connect the various pipeline sections. Such a remote, subsea connection must be made without surface retrieval and connection of pipeline ends. To achieve such, the present invention is employed. For purposes of clarity, the terms pipelines and pipeline sections as used herein are interchangeable. The present invention is equally capable of remotely connecting either the ends of pipelines or pipeline sections.

Referring now to the right-hand side of FIG. 1, a floating drilling vessel 21 is shown lowering a moveable base plate 22 to the sea floor by means of a drill string 23. As illustrated, the base plate 22 is lowered to a position on the sea floor which may be a significant distance from the support base 19 of the SALM 12.

The base plate 22 is positioned on the sea floor so that the base plate, support base 19 and well site from the vertices of a triangle. Preferably, the base plate is positioned such that an angle $\phi$ (see FIG. 7) between two pipelines extending from the support base 19 and the well site to the base plate ranges from about 70° to about 130°. Preferably, angle $\phi$ should range from about 70° to about 110°, and, most preferably, the angle $\phi$ should be about 90°. As will be discussed below, such an angular orientation will allow relative lateral deflection of the pipelines' ends when one end has already been attached to the base plate and the other end is being attached to it.

Figure 2:
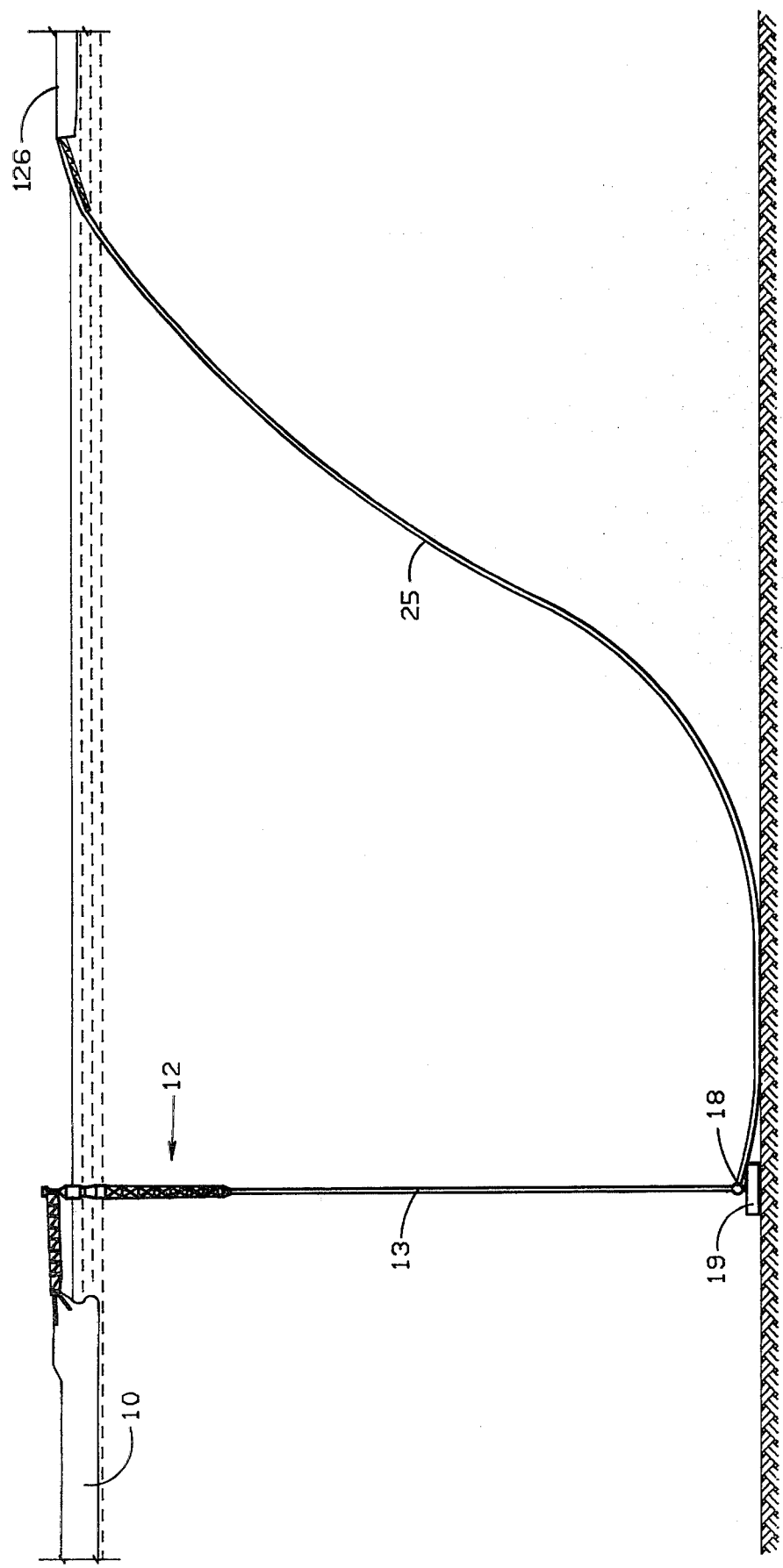
FIG. 2 is an elevation view of a lay barge setting a pipeline on the sea floor which is initially attached to the Single Anchor Leg Mooring system of FIG. 1.

Referring to FIG. 2, once the base plate is positioned on the sea floor, a pipeline 25 is lowered to the sea floor by a lay barge 126 and connected to the support base 19 by conventional techniques (see for example, Offshore Technology Conference Paper No. 2526 presented at the May 3-6, 1976, meeting by A. R. Sinclair, J. A. Burkhardt, and A. C. Daughtry). With the pipeline connected to the support base 19, the lay barge moves away from the SALM in the direction of the base plate 22. The lay barge may be of any suitable design capable of laying pipe on the sea floor.

Once the lay barge reaches the approximate location of the base plate, the pipeline 25 is terminated at a length which permits the end to be lowered within the vicinity of the base plate. The approximate length of the pipeline 25 can be determined by measuring the distance between the support base 19 and the base plate 22. This measurement can be made visually or with conventional sonic apparatuses commercially available. The orientation of the pipeline with respect to the sea floor and base should also be considered in making such a measurement.

Figure 5:
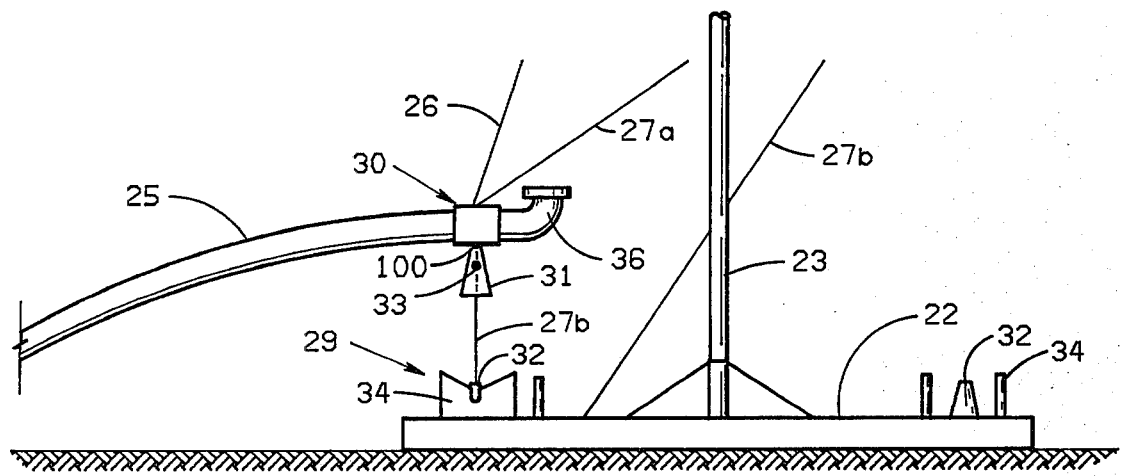
FIG. 5 is an enlarged elevation view showing the pipeline end being pulled in and lowered for attachment to the base plate.
Figure 6:
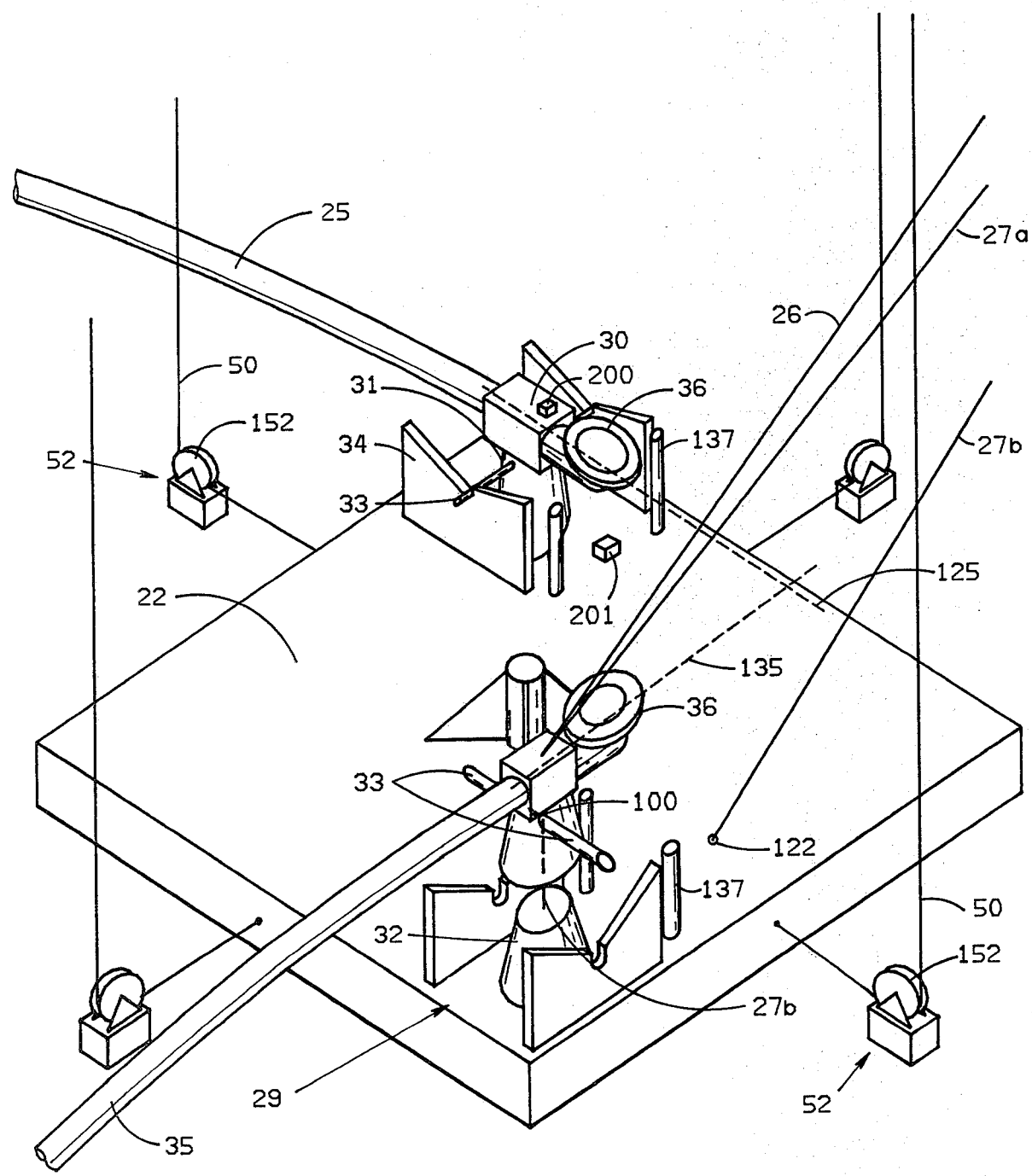
FIG. 6 is an isometric view of the end of a second pipeline being pulled in and lowered for attachment to the base plate.

Referring to FIGS. 5 and 6, after the design length of the pipeline 25 is jointed at the barge 126, a coupling elbow 36 and alignment structure 30 are connected to the end of the pipeline 25 by conventional methods, i.e., welding. The coupling elbow 36 is attached to the pipeline so that the open end of the elbow 36 faces upwardly toward the water surface when the pipeline is attached to the base plate. The alignment structure 30 comprises a funnel-shaped guide sleeve 31 having alignment arms 33 rigidly attached thereto.

As illustrated in FIGS. 5 and 6, the base plate 22 is a square structure. It may be made of concrete, steel or the like. Although the base plate as illustrated is square, it is understood that the structure could be any size or shape suitable for resting on the sea floor and connecting two pipelines. The base plate 22 includes guide assemblies 29 which are preferably located on opposite corners of the base plate. However, this is not essential. The guide assemblies may be adjacent one another provided that the pipelines are permitted to intersect within the range of angle $\phi$ noted above.

Each guide assembly 29 comprises a cradle frame 34 and a guide post 32. The guide assembly provides for the exact self-alignment of each pipeline with the base plate 22 in both a vertical and horizontal direction. The alignment arms 33, which extend outwardly with respect to the guide sleeve 31, are sized to engage the cradle frame 34.

Figure 3:
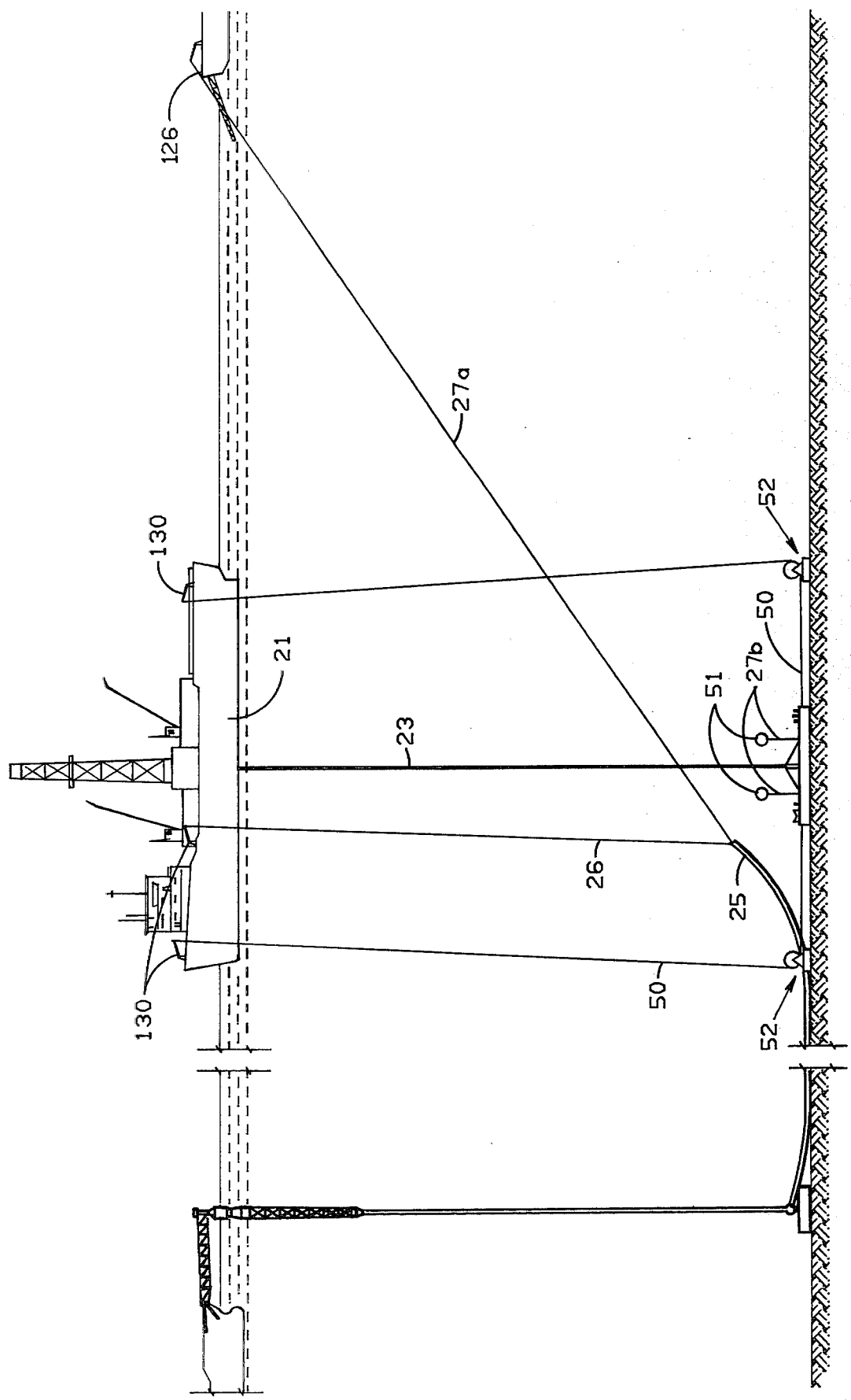
FIG. 3 is an elevation view, partly in section, of the lay barge of FIG. 2 setting down the final section of the pipeline as it approaches the base plate.
Figure 4:
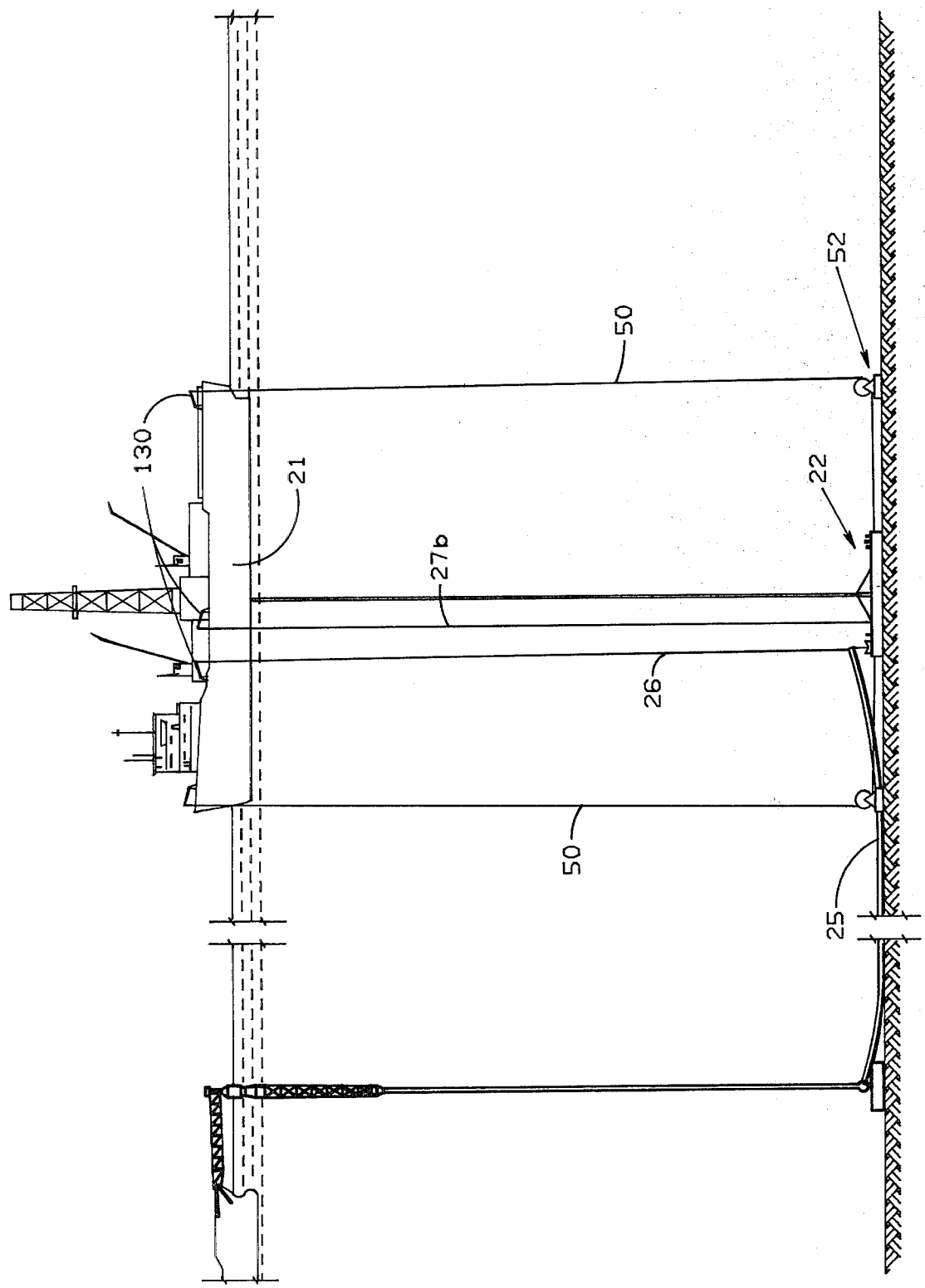
FIG. 4 is an elevation view, partly in section, of the final pipeline section being pulled in and lowered onto the base plate.

Referring to FIGS. 3 and 4, after the coupling elbow 36 and the alignment structure 30 are connected to the pipeline 25, a lowering line 26, which extends from the drilling vessel 21, is attached to the coupling elbow 36. The barge 126 then advances forward past the vicinity of the base plate 22 and continues to payout the pipeline 25 maintaining axial tension on the pipeline 25 with a line 27a. A drawing line 27b is also connected to the end of the pipeline 25 which is used to guide the end of the pipeline onto the base plate. During pipeline lowering operations, the line 27b is attached to the bottom of the elbow 36 at the point 100 and passes down through the guide sleeve 31 to the base plate. At the base plate, the line 27b passes through the guide post 32 around the bottom side of the base plate and exits through an aperture 122 on the topside of the base plate (see FIGS. 5 and 6 for a view of the line 27b within the base plate). The line 27b then extends upwardly to the water surface where it is attached to the vessel 21.

Preferably before the base is lowered to the sea floor, the line 27b is initially drawn through the base plate, and both ends of the line 27b are connected to a remotely operated release buoy 51 which is submerged with the base plate (see FIG. 3). Since generally two lines 27b are used, one line for each of the pipelines to be connected, two buoys 51 are used as shown in FIG. 3. However for clarity, one line 27b is shown in FIG. 4. When it is time to lower the pipeline 25, the buoys 51 are released from the base plate by a remote acoustical, electrical, or other signal transmitted from above the water surface. Such remotely operated release buoys are well known and are commercially available. By using the buoys the chances of entangling the vessels and support equipment within the lines before the lowering and connecting procedure begins are minimized. Thus, both ends of the line 27b are carried to the surface by the rising buoys. One end of the line 27b is then connected to the elbow 36 at the point 100, and the other end of the line 27b is connected to the vessel 21.

The lines 26, 27a and 27b are secured to suitable tension means on the drilling vessel 21 and barge 126 such as winchs 130. During operation, the end of the pipeline 25, which is attached to the lines 26 and 27a, is lowered from the barge 126 by paying out the line 27a. Sufficient axial tension must be maintained in the pipeline via the line 27a throughout the lowering procedure to avoid buckling it. Buckling will occur if the induced pipeline stresses exceed the yield stress of the pipeline. This may occur from the bending of the pipeline under its own weight as it is lowered. The amount of bending can be controlled with the axial tension applied to the pipeline via the line 27a.

The tension force imposed by the line 27a has both a vertical component acting upwardly and a horizontal component acting away from the pipeline in the direction that the barge is moving. The tension force should be exerted until a portion of the pipeline reaches a predetermined position which by analysis indicates that the pipeline can descend under its own weight without buckling or otherwise deforming. At this point, the line 27a is generally almost horizontal. Since a horizontal component is no longer required, the tension on the line 27a may be released. However, a vertical component should be maintained to reduce the pipelines' descent to the sea floor and reduce the chances of damaging the pipeline as it contacts the sea floor. Such a vertical component is maintained by the line 26.

Referring still to FIG. 5, as the end of the pipeline 25 approaches the base plate 22, the line 27b serves to generally align the guide sleeve 31 with the guide post 32. As the line 26 is payed out, the end of the pipeline 25 continues to descend approaching the base plate, and the alignment structure 30 engages the guide assembly 29. The alignment arms 33 thereby engage and lock into the cradle frame 34.

An alternative to the use of the line 27b to guide the alignment structure 30 onto the corresponding guide assembly 29 is to use acoustical transponders 200, 201 attached to each alignment structure and guide assembly (see FIG. 6). Each transponder emits a signal to a receiver on board a surface vessel. The signal appears as a dot on a cathode ray tube. Thus, the operator knows the relative location of each alignment structure 30 with respect to its corresponding guide assembly 29 as the pipeline is lowered. Such acoustical transponders and receiver systems are commercially available and well known to those skilled in the art.

Once the pipeline 25 has been positioned on the base plate 22 (see FIG. 6), a second pipeline 35 is attached to a well site (not shown) in the same manner as the pipeline 25 was attached to the support base 19. The pipeline 35 is then laid on the sea floor and attached to the base plate 22 in the same manner as the pipeline 25 was attached. The pipelines should approach the base plate 22 such that the longitudinal axis of the pipelines intersect between about 70° and 130° with respect to one another (see angle $\phi$ in FIG. 7). Preferably, this range should be between about 70° to 110° and most preferably, about 90°.

In the event the pipeline 35 does not terminate exactly at the base plate 22, the base plate 22 can be easily moved in a direction substantially parallel to the longitudinal axis 135 of the pipelines 35 (or substantially normal to the longitudinal axis 125 of the pipeline 25) because of the lateral flexibility of the pipeline 25 (see FIG. 6). The degree of lateral flexibility of a pipeline is generally a function of its length, diameter, and wall thickness. For offshore purposes, a pipeline is generally very long and is, therefore, quite flexible. This is evident from the curved profile which the pipeline will undergo as it is lowered to the sea floor from the lay barge.

The base plate can be laterally displaced with the drill string 23 which extends from the base plate to the drilling vessel 21. By moving the drill string 23 horizontally at the water surface, the base plate is laterally displaced at the sea floor. In addition, the base plate may include a series of cables 50 (see FIGS. 3 and 6) attached to the sides of the base plate and extending outwardly therefrom to clump weights 52 disposed on the sea floor. The clump weights 52 serve to space the cables 50 out from the base plate in a horizontally oriented attitude. Each cable 50 wraps around a pulley 152 of the clump weight and continues upwardly to the vessel 21. Preferably, one cable 50 is provided for each side of the base plate. Thus, the base plate can be laterally displaced in any direction pulling and releasing the corresponding cables on the deck of the vessel.

If acoustical transponders are used, as discussed above, the drill string 23 and cable 50/clump weight 52 assembly would be used to laterally displace the base plate so as to locate each guide assembly directly below the corresponding alignment structure 30 as it approached the base plate.

It is not necessary that the base plate be positioned on the sea floor after the pipeline 25 is lowered yet before the pipeline 35 is lowered. The order of events will depend primarily on the availability of the vessels. For example, the two pipelines 25 and 35 may be initially lowered to the sea floor and then the moveable base plate lowered. In this event, the end of one of the pipelines would be raised slightly with the line 26 and the base plate would be maneuvered under the alignment structure 30 by means of the drill string 23, cables 50 and line 27b. The end of the second pipeline would then be raised and the base plate maneuvered thereunder until it was aligned with the corresponding guide assembly. The present invention does not require that the end of a pipeline be retrieved and brought to the water surface as is required in U.S. Pat. No. 3,670,513 (Matthews). As another example of a different order of events, the moveable base plate may be attached to the end of the first pipeline at the water surface. Both base plate and pipeline would then be lowered to the sea floor as a unit and the second pipeline connected to the base plate at the sea floor as mentioned above. These are merely two examples of the order of events which may occur when the invention is practiced. Modification to the sequence will be apparent to those skilled in the art in view of this disclosure.

Figure 7:
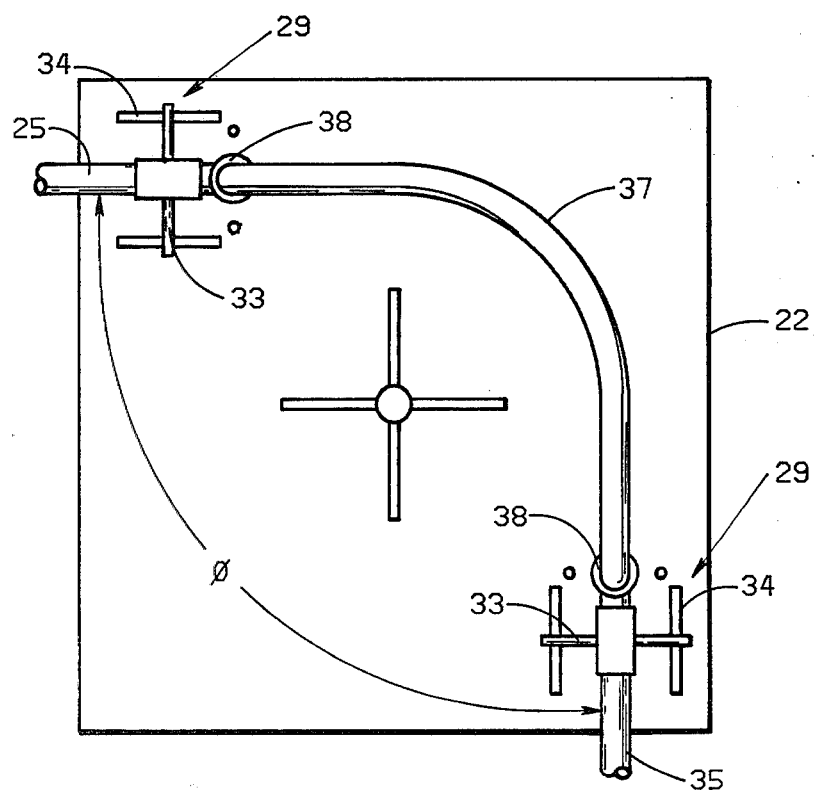
FIG. 7 is a plan view of a completed connection between the first and second pipeline ends of the base plate.

Referring now to FIG. 7, once the two pipelines 25 and 35 are attached to the base plate, an elbow joint 37 is lowered into place between the ends of the coupling elbows 36 using conventional placement techniques. For example, guidelines (not shown) may be installed between the base plate 22 and the surface vessel. The elbow joint 37 would be lowered by cable along the guidelines onto the base plate (see U.S. Pat. No. 3,775,986 for more details of this technique). The base plate may include a set of posts 137 positioned near each guide assembly which serve to guide and align the elbow 37 into position.

After the elbow 37 has been lowered into position between the coupling elbows 36, hydraulic connectors 38 are activated from the surface which provide a pressure-tight connection between the pipelines. Such connections are commercially available and are well known to those skilled in the art.

The invention disclosed herein illustrates an improvement which minimizes the length and angular adjustments necessary to connect two subsea pipelines. The present invention has been described in terms of a preferred embodiment. Modifications and alterations to this embodiment will be apparent to those skilled in the art in view of this disclosure. It is intended that such equivalent modifications and variations fall within the spirit and scope of this invention as claimed.

What is claimed is:

1. A method for making a flowline connection between the ends of two subsea pipelines with a connector assembly, said method comprising the steps of:
    (a) attaching the end of a first pipeline to the connector assembly;
    (b) displacing the connector assembly laterally along the sea floor in a direction substantially normal to the longitudinal axis of the first pipeline so that the end of a second pipeline terminates at the connector assembly;
    (c) attaching the end of the second pipeline to the connector assembly; and
    (d) connecting the ends of the pipelines at the connector assembly so that the pipelines are in fluid communication.

2. A method for making a flowline connection between the ends of two subsea pipelines comprising the steps of:
    (a) lowering to the sea floor a first pipeline which extends from a first subsea site to a base plate;
    (b) attaching the end of the first pipeline to the base plate;
    (c) lowering to the sea floor a second pipeline which extends from a second subsea site and terminates in the approximate vicinity of the base plate;
    (d) making lateral adjustments with the base plate so that the second pipeline terminates at the base plate, said base plate and said first and second subsea sites forming the vertices of a triangle;
    (e) attaching the end of the second pipeline to the base plate; and
    (f) connecting the ends of the pipelines at the base plate so that the pipelines are in fluid communication.

3. The method as defined in claim 2 further comprising the step of lowering the base plate to the sea floor prior to lowering the first pipeline.

4. The method as defined in claim 2 further comprising the step of attaching the base plate to one end of the first pipeline and lowering simultaneously the base plate and first pipeline to the sea floor.

5. The method according to claim 2 wherein the longitudinal axes of the pipelines intersect between about 70° and 130°.

6. The method according to claim 5 wherein the longitudinal axes of the pipelines intersect preferably between about 70° and 110°.

7. The method according to claim 6 wherein the longitudinal axes of the pipelines intersect most preferably at about 90°.

8. The method as defined in claim 2 wherein the first pipeline is lowered with a lay barge.

9. The method as defined in claim 2 wherein the base plate is lowered to the sea floor by means of a drilling vessel.

10. The method as defined in claim 2 wherein one end of the first pipeline is connected to a production riser.

11. A method for making a flowline connection between the ends of the two subsea pipelines comprising the steps of:
    (a) lowering to the sea floor a first pipeline, having a first and second end, attached at the first end to a first subsea site located on the sea floor;
    (b) attaching the end of a second pipeline to a connector assembly at the water surface;
    (c) lowering the end of the second pipeline and the connector assembly to the sea floor;
    (d) making lateral adjustments with the connector assembly so that the second end of the first pipeline terminates at the connector assembly;
    (e) attaching the second end of the first pipeline to the connector assembly; and
    (f) connecting the ends of the pipelines at the connector assembly so that the pipelines are in fluid communication.

12. A method for making a flowline connection between the ends of two subsea pipelines comprising the steps of:
    (a) lowering to the sea floor a first pipeline which extends from a first subsea site to a connector assembly located on the sea floor;
    (b) attaching the end of the first pipeline to the connector assembly;
    (c) lowering to the sea floor a second pipeline which terminates in the approximate vicinity of the connector assembly;
    (d) displacing the connector assembly laterally along the sea floor in a direction substantially normal to the longitudinal axis of the first pipeline so that the end of the second pipeline terminates at the connector assembly;

(e) attaching the end of the second pipeline to the connector assembly; and (f) connecting the ends of the pipelines at the connector assembly so that the pipelines are in fluid communication.

13. A subsea structure for making a flowline connection between the ends of two subsea pipelines comprising:

a base plate capable of being submerged and contacting the sea floor at a subsea site adjacent the ends of the pipelines;

a first guide assembly attached to said base plate for guiding and attaching the end of one pipeline to said base plate;

a second guide assembly attached to said base plate for guiding and attaching the end of the other pipeline to said base plate;

means for displacing said base plate along the sea floor in a direction substantially normal to the longitudinal axis of the one pipeline to compensate for any misalignment between the ends of the pipelines; and means for completing a pressure-tight flowline connection between the ends of the pipelines once the pipelines are attached to said base plate.

14. The structure according to claim 13 wherein said displacing means comprises an enlongated member attached to said base plate and extending vertically therefrom to the water surface so that horizontal displacement of said member at the water surface causes horizontal displacement of said base plate at the sea floor.

15. The structure according to claim 14 wherein said displacing means further comprises:

a plurality of cables attached to said base plate and extending outwardly from said base plate substantially parallel to the sea floor; and a plurality of clump weights positioned on the sea floor peripherally about said base plate, said cables engaging said clump weights and extending upwardly therefrom to the water surface so that tensioning of said cables causes displacement of said base plate along the sea floor.

16. The structure according to claim 13 wherein said structure further comprises an alignment structure attached to the end of each pipeline and capable of engaging said guide assemblies.

* * * * *